United States Patent [19]

Kervagoret

[11] Patent Number: 4,712,631

[45] Date of Patent: Dec. 15, 1987

[54] ASSISTED STEERING SYSTEM FOR A MOTOR VEHICLE

[75] Inventor: Gilbert Kervagoret, Argenteuil, France

[73] Assignee: Bendix France, Paris, France

[21] Appl. No.: 844,483

[22] Filed: Mar. 26, 1986

[30] Foreign Application Priority Data

Apr. 2, 1985 [FR] France .................................. 85 04985

[51] Int. Cl.[4] .......................... B62D 5/06; B62D 5/09
[52] U.S. Cl. .................................. 180/143; 251/129.15
[58] Field of Search ............... 180/132, 133, 136, 141, 180/142, 143, 79.1, 79.3; 251/129.15

[56] References Cited

U.S. PATENT DOCUMENTS

| | | | |
|---|---|---|---|
| 3,960,234 | 6/1976 | Morgan | 180/132 |
| 4,262,877 | 4/1981 | Lang | 251/129.15 |
| 4,437,532 | 3/1984 | Nakamura | 180/143 |

FOREIGN PATENT DOCUMENTS

| | | | |
|---|---|---|---|
| 201765 | 12/1982 | Japan | 180/133 |
| 141964 | 8/1983 | Japan | 180/132 |
| 141965 | 8/1983 | Japan | 180/132 |
| 193988 | 11/1983 | Japan | 251/129.15 |
| 471427 | 9/1937 | United Kingdom | 251/129.15 |

Primary Examiner—John J. Love
Assistant Examiner—Everett G. Diederiks, Jr.
Attorney, Agent, or Firm—Larry J. Palguta; Ken C. Decker

[57] ABSTRACT

In a bridging circuit ($6_a$, $6_b$) connecting the two opposing chambers ($V_1$, $V_2$) of the hydraulic assistance actuator (5), a valve seat (11) is interposed which may be closed selectively by a valve member which is biased by an electromagnetic actuator (14) having two states, energized and unenergized, which is controlled by at least one switch ($18_a$, $18_b$) actuatable by the lever (19) of the gear changing mechanism of the vehicle so as to close the bridging circuit ($6_a$, $6_b$) when the parking gears are engaged (first and reverse) in order to obtain maximum hydraulic assistance power, the assistance power being reduced during other conditions of use of the vehicle (driving along the road).

4 Claims, 3 Drawing Figures

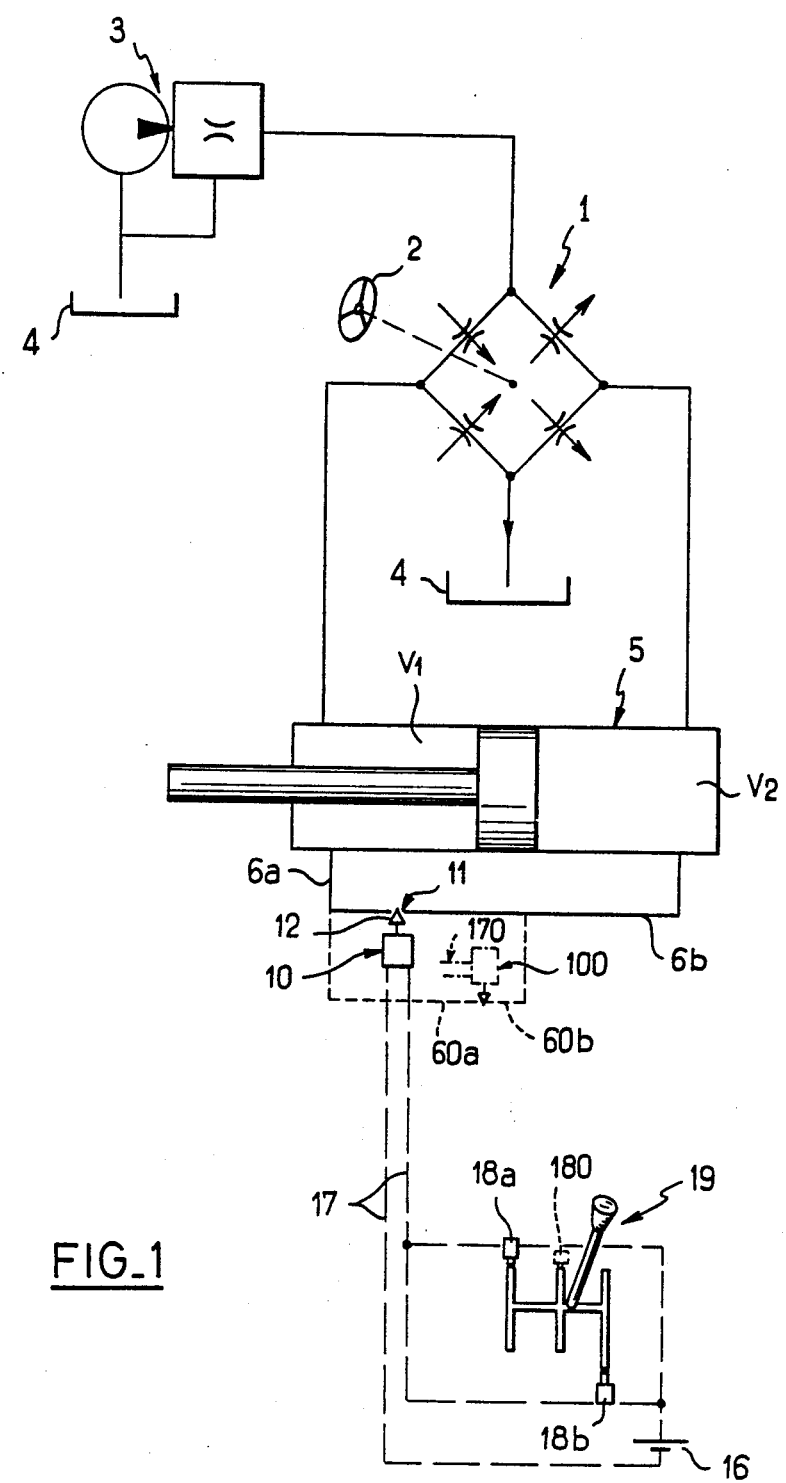
FIG_1

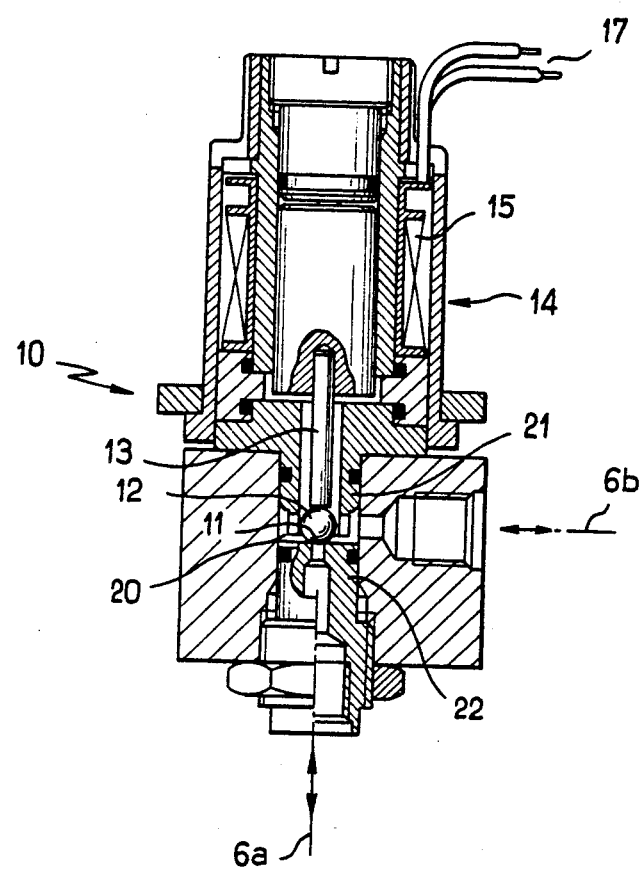
FIG_2

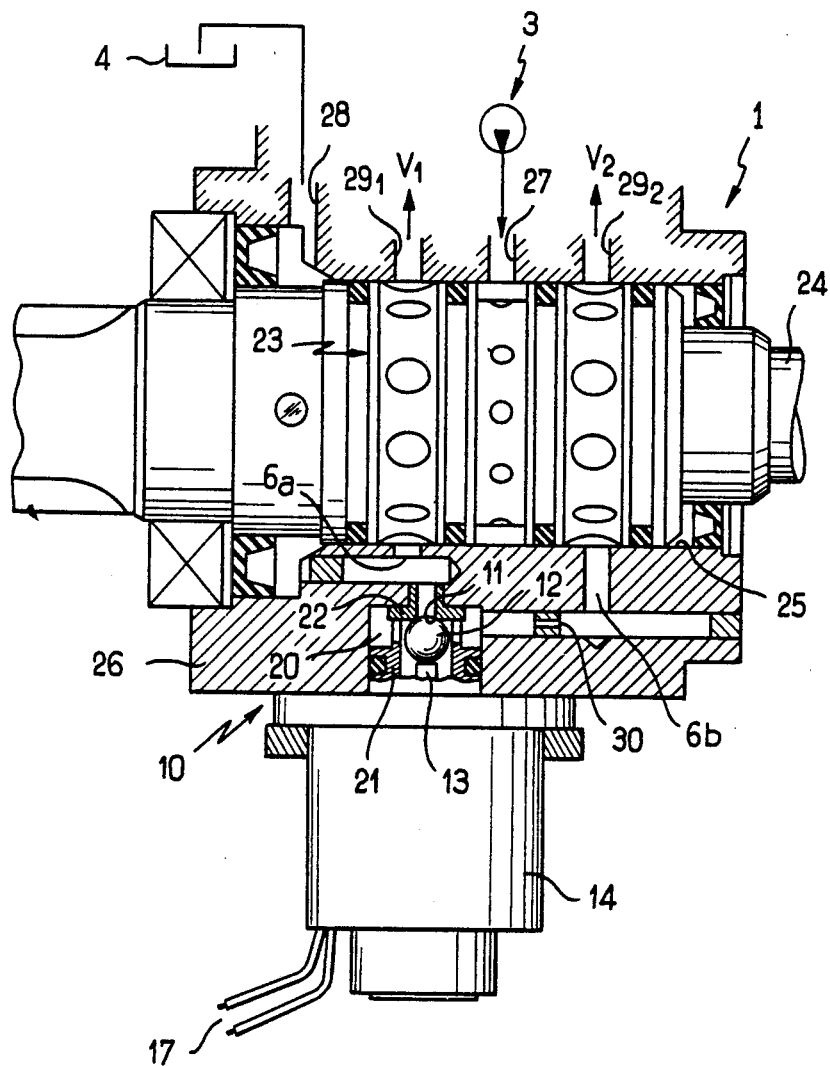
FIG_3

ASSISTED STEERING SYSTEM FOR A MOTOR VEHICLE

The present invention concerns assisted steering systems for a motor vehicle having a hand lever for a gear changing mechanism, of the type comprising: a hydraulic assistance actuator with two opposing chambers supplied selectively with fluid under pressure, coming from a source of pressure, through a distribution valve device, and a valve means with electromagnetic control in a bridging circuit which connects the two chambers of the hydraulic actuator and is connected to an electrical control circuit.

An assisted steering system of this type is described in the document EP-A-O, No. 109, 085. In this document, the valve means with electromagnetic control comprises a modulating slide having an internal passage and actuated, against a spring, by a solenoid with a proportional effect which is controlled by the amplitude of an electrical signal which is a function particularly of the speed of the vehicle, in an arrangement requiring relatively sophisticated and fragile operation and control electrical circuit so as to control a magnetic field controlling in turn permanently the position of the modulating slide and thus to modulate the assistance power which is effectively provided by the hydraulic actuator.

In fact, in practice, the full power of an assisted steering system is essentially required during parking maneuvers, whereas during phases of driving along the road, of even in town, reduced assistance is sufficient, irrespective of the effective speed of the vehicle during these phases of driving along.

One object of the present invention is to propose an assisted steering system of the type mentioned above with control of the hydraulic assistance power in two modes as a function of the driving conditions of the vehicle, in an arrangement which is particularly simple and robust, requiring only inexpensive components and having improved reliability.

To achieve this, according to a feature of the invention, the valve means with electromagnetic control comprises a valve seat which is interposed in the bridging circuit and may be closed selectively by a valve member which is associated to a plunger of an electromagnetic actuator, the electrical control circuit of the latter including at least one switch actuatable by the lever of the gear changing mechanism.

In this arrangement, with such a switch arranged in such a way that it closes when first gear or reverse gear is engaged so as to close in turn the valve component onto its seat, the hydraulic assistance actuator then gives full assistance power in the usual conditions for parking a vehicle whereas, as soon as any other gear is engaged, the electromagnetic actuator is de-energized and a bridging circuit connecting the chambers of the hydraulic actuator is opened, thus substracting from the active chamber of the actuator a portion of the fluid under pressure which is addressed to it, which results for the vehicle in reduced assistance to the steering according to a curve which is different from the curve of full assistance which, however, becomes effective once again as soon as the vehicle regains parking conditions. The assisted steering system according to the invention is equally suitable for a vehicle provided with an automatic gear changing mechanism with a selection lever incorporating parking and reverse positions.

Other features and advantages of the present invention will emerge from the following description of embodiments which are given by way of illustration but are not limiting in any way, with reference to the accompanying drawings, in which:

FIG. 1 is a diagrammatic illustration of an assisted steering system according to the invention;

FIG. 2 is an illustration in section of the valve means with electromagnetic control of the system shown in FIG. 1; and FIG. 3 is a diagrammatic view, partially sectioned, of an embodiment which is integrated into an assisted steering system according to the invention.

In the description which follows and in the drawings, identical or similar components carry the same reference numbers.

The diagram of FIG. 1 shows an assisted steering system for a vehicle including, in a manner which is in itself known, a distribution servovalve 1, which is actuated by the steering wheel 2 of the vehicle and is interposed between a source of fluid under pressure 3, generally equipped with a built-in flow regulating device, and a low pressure reservoir or tank 4, and which is capable of being actuated so as to supply selectively and in turn with fluid under pressure the opposing chambers $V_1$ and $V_2$ of a hydraulic actuator 5 for assistance with steering. In accordance with the invention, a bridging circuit $6_a$ and $6_b$, which is independent of the supply lines for the hydraulic actuator 5 coming from the distribution servovalve 1, interconnects the two chambers $V_1$ and $V_2$ of the hydraulic actuator 5. In the bridging circuit $6_a$, $6_b$, a valve means with electromagnetic control is interposed, given the general reference 10, defining internally, as shown more clearly in FIGS. 2 and 3, a fluid passage connecting the two portions $6_a$ and $6_b$ of the bridging circuit and incorporating a valve seat 11 which may be closed by a valve member 12 which is associated to a plunger 13 of an electromagnetic actuator 14 of the type having two states, energized or unenergized coil 15 is connected to an electrical power source 16 by an electrical control line 17 including at least one electrical switch $18_a$, $18_b$ of the type which may be opened or closed. In accordance with the invention, the electrical switches $18_a$, $18_b$ are associated with the lever 19 of the gear changing mechanism of the vehicle. In the example shown in FIG. 1, which corresponds to a manual gear changing mechanism with a European gate, two switches $18_a$, $18_b$ are provided which are arranged relative to the gate so as to close when the lever of the gear changing mechanism 19 engages first or reverse, respectively. In this way, as mentioned above, when first or reverse is engaged, the corresponding electrical switch $18_a$ or $18_b$ closes, thus closing the electrical control line 17 and energizing the electromagnetic actuator 14 so as to hold the valve member 12 closed upon its seat 11 thus isolating from one another the portions $6_a$ and $6_b$ of the bridging circuit. However, when the lever 19 engages another gear, the switches $18_a$, $18_b$ are opened, which has the effect of de-energizing the electromagnetic actuator 14 and of allowing the valve member 12 to disengage from its seat 11 so as to establish a bypass communication between the two chambers $V_1$ and $V_2$ of the hydraulic actuator 5.

As shown clearly in FIGS. 2 and 3, the valve member 12 is situated in a cylindrical chamber 20 in which a tubular mounting base 21 of the electromagnetic actuator 14 is engaged. The valve seat 11 is formed by an insert 22 which is mounted in the chamber 20 and defines a passage of reduced cross-section forming a calibrated restriction between the two portions $6_a$ and $6_b$ of the bridging circuit. As a variant, as shown in FIG. 1, in parallel with the bridging circuit $6_a$, $6_b$, a second bridging circuit $60_a$, $60_b$ may be provided which is provided with a valve means with electromagnetic control 100 which is similar to the valve means 10 described previously and is controlled by its own electrical control circuit 170 including an electrical switch 180 which is actuatable by the gear change lever 19 but during the engagement of a gear for driving along the road. In such an arrangement, the valve of the valve means with electromagnetic control 100 will itself be of the normally closed type so that its opening, during the engagement of a gear for driving along the road, creates in addition to the restriction of the valve seat 11 of the first valve means 10 an intercommunication of larger cross-section between the chambers $V_1$ and $V_2$ of the actuator 5, consequently reducing further the assistance power provided by the actuator 5.

FIG. 3 shows an embodiment which is integrated into an assisted steering system according to the invention. This FIG. 3 shows diagrammatically the distribution servovalve 1 of the type incorporating a rotary valve assembly 23, which is rotatingly actuated by an input shaft 24 coupled to the steering wheel 2, in a bore 25 of a valve body 26. Opening into the bore 25 are an inlet port 27, which is connected to the source of pressure 3, an outlet port 28, which is connected to the reservoir 4, and two distribution ports $29_1$ and $29_2$ which are connected to the opposing chambers $V_1$ and $V_2$, respectively, of the actuator 5. In this embodiment, the bridging circuit $6_a$, $6_b$, together with the chamber 20, are formed in the valve body 26 so as to communicate, via the annular grooves of the external sleeve of the valve assembly 23, with the distribution ports $29_1$ and $29_2$. In this embodiment, a fixed restriction 30 of small transverse cross-section is advantageously provided, in addition to the restriction formed by the valve seat 11, in the bridging circuit $6_a$, $6_b$. The valve means with electromagnetic control 10 is otherwise identical to that previously described in relation to FIGS. 1 and 2.

I claim:

1. In a motor vehicle having a lever for a gear-changing mechanism, an assisted steering system comprising a hydraulic assistance actuator with two opposing chambers supplied selectively with fluid under pressure, the fluid coming from a source of pressure, through a distribution valve device, and valve means with electromagnetic control in a bridging circuit interconnecting the two opposing chambers of the hydraulic assistance actuator, the valve means connected to an electrical control circuit, the improvement consisting of the valve means with electromagnetic control having a valve seat between two ports in a control body interposed directly in the bridging circuit and that may be closed selectively by a ball valve associated with a plunger of an electromagnetic actuator, the valve seat forming a calibrated restriction in an insert secured to the control body in the bridging circuit, a mounting base of the electromagnetic actuator secured to the control body and having a seal thereabout, the ball valve member biased by the plunger and housed in a cavity defined between the seal and insert, the cavity forming part of the bridging circuit, the electrical control circuit including at least one switch actuable by the lever of the gear-changing mechanism and the switch actuating the electromagnetic actuator, the switch engageable by the lever and connected directly, by means of the electrical control circuit, to only the electromagnetic control and a power source.

2. The system in accordance with claim 1, wherein the distribution valve device comprises a distributor body which includes the control body, a distribution valve assembly mounted in the distributor body and the valve assembly comprising two distribution ports connected to the opposing chambers, respectively, of the hydraulic assistance actuator, the bridging circuit formed within the distributor body.

3. The system in accordance with claim 2, wherein the bridging circuit communicates, in the distributor body, with the distribution ports, the cavity disposed in the distributor body.

4. The system in accordance with claim 1, wherein the insert has a seal thereabout, the cavity further defined between the seals.

* * * * *